United States Patent [19]
Hoover

[11] Patent Number: 6,046,260
[45] Date of Patent: *Apr. 4, 2000

[54] ZINC OXIDE DISPERSION

[75] Inventor: James W. Hoover, Akron, Ohio

[73] Assignee: Flow Polymers, Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/006,265

[22] Filed: Jan. 13, 1998

[51] Int. Cl.⁷ .................... C08L 95/00; C08K 3/20; C08K 5/09
[52] U.S. Cl. .................... 524/71; 106/219; 106/241; 106/269; 106/281.1; 106/284.02; 523/351; 524/59; 524/68; 524/69; 524/70; 524/312; 524/313; 524/318; 524/322; 524/432
[58] Field of Search .................... 106/219, 241, 106/269, 281.1, 284.02; 523/351; 524/59, 68, 69, 70, 71, 312, 313, 322, 432, 315, 318

[56] References Cited

U.S. PATENT DOCUMENTS

| | | | |
|---|---|---|---|
| 2,344,831 | 3/1944 | Ott | 556/49 |
| 2,395,506 | 2/1946 | Sauser | 525/332.5 |
| 2,427,514 | 9/1947 | Sterrett et al. | 525/373 |
| 2,554,461 | 5/1951 | Howes et al. | 106/269 |
| 3,833,683 | 9/1974 | Dickie et al. | 525/286 |
| 4,048,258 | 9/1977 | Baldwin et al. | 525/285 |
| 4,137,384 | 1/1979 | Finelli et al. | 525/348 |
| 4,161,410 | 7/1979 | Pellico | 106/219 |
| 4,175,977 | 11/1979 | Heaton et al. | 106/272 |
| 4,204,046 | 5/1980 | Minatone et al. | 525/67 |
| 4,394,488 | 7/1983 | Kim et al. | 524/432 |
| 4,970,268 | 11/1990 | Udding | 525/370 |
| 5,063,268 | 11/1991 | Young | 524/286 |
| 5,320,874 | 6/1994 | Kansupada et al. | 427/393.5 |
| 5,650,454 | 7/1997 | Hoover et al. | 524/47 |

OTHER PUBLICATIONS

Elastochem Inc., Material Safety Data Sheet for Elast–O–Zinc Curebead, Jan. 20, 1992, pp. 1–3.

Don R. Smith, editor, *Blue Book* 1997, 1997, pp. 75, 82, 84–85, 88–91, 95–97.

*Primary Examiner*—Peter A. Szekely
*Attorney, Agent, or Firm*—Pearne, Gordon, McCoy & Granger LLP

[57] ABSTRACT

A zinc oxide dispersion for use in rubber compounds having at least 40, preferably 74–92, weight percent zinc oxide powder and at least five weight percent of a binder selected from the group consisting of asphalt and terpene tackifiers. The dispersion also preferably includes at least 0.5 weight percent stearifying agent such as stearic acid.

35 Claims, No Drawings

ZINC OXIDE DISPERSION

FIELD OF THE INVENTION

This invention relates generally to zinc oxide and more particularly to a zinc oxide dispersion for use in rubber compounds.

DESCRIPTION OF RELATED ART

Most elastomers such as natural and synthetic rubbers require zinc oxide as a means for either activation of cure or for vulcanization. It is well known in the rubber industry that zinc oxide has a low affinity towards most elastomers and is very difficult to efficiently incorporate into a rubber matrix or compound. To overcome some of the difficulties of incorporating zinc oxide into rubber compounds, some zinc oxide dispersions have been developed to facilitate zinc oxide incorporation. However, these known zinc oxide dispersions have failings in certain regards such as cost, limited applicability, and effectiveness. There is a need for a more effective and more useful zinc oxide dispersion for use in rubber compounds.

SUMMARY OF THE INVENTION

A zinc oxide dispersion comprising at least 40 weight percent zinc oxide powder and at least 5 weight percent of a binder selected from the group consisting of asphalt and terpene tackifiers. A rubber compound comprising the zinc oxide dispersion and rubber selected from the group consisting of natural rubbers, synthetic rubbers, and mixtures thereof.

DETAILED DESCRIPTION OF THE PREFERRED EMBODIMENTS OF THE INVENTION

Parts are parts by weight and percents are weight percents unless otherwise indicated or apparent. When a preferred range such as 5–25 is given, this means preferably at least 5 and preferably not more than 25.

The invented zinc oxide dispersion has the following preferred formulation (Formulation 1).

| | Ingredient | Weight Percent | | |
|---|---|---|---|---|
| | | Preferred | Less Preferred | Less Preferred |
| 1. | Asphalt | 17 | 11–23 | 5–30 |
| 2. | Stearifying agent | 3 | 1.5–6 | 0.5–10 |
| 3. | Zinc oxide powder | 80 | 60–90 | 40–96 |

The asphalt is preferably a blend of 55%, less preferably 45–65%, less preferably 35–75%, asphalt (preferably monor asphalt from Sun Refining) and 45%, less preferably 35–55%, less preferably 25–70%, blown asphalt. Less preferably the asphalt is 100% asphalt such as monor or 100% blown asphalt. Blown asphalt, which is asphalt, is produced by blowing air through asphalt at 400–600° F. followed by cooling and is also known as oxidized asphalt.

The stearifying agent is a material selected from the group consisting of fatty acids and fatty acid esters and mixtures thereof. The stearifying agent and fatty acid is preferably stearic acid, less preferably oleic, palmitic, linoleic, or linolenic acid, or a mixture thereof. The stearic acid preferably has an acid value of 193–212 and a maximum iodine value of 10. The fatty acid ester is preferably a triglyceride such as a hydrogenated triglyceride such as Neustrene 060 from Humko Chemical. The stearifying agent, which is uncrosslinked, adds lubricity to the blend as well as preferably modestly reacting with the ZnO yielding a slight degree of stearification. The zinc oxide powder is the zinc oxide powder known in the rubber compounding art.

The above formulation yields a dark colored finished product that may discolor or stain white or light colored rubber compounds. Where color retention is important, an alternative formulation for the invented zinc oxide dispersion can be used, as follows (Formulation 2).

| | Ingredient | Weight Percent | | |
|---|---|---|---|---|
| | | Preferred | Less Preferred | Less Preferred |
| 1. | Terpene tackifier | 16 | 10–22 | 5–30 |
| 2. | Petrolatum | 1 | 0.6–1.5 | 0.2–2 |
| 3. | Stearifying agent | 3 | 1.5–6 | 0.5–10 |
| 4. | Zinc oxide powder | 80 | 60–90 | 40–96 |

As used herein, Sta-Tac (CAS No. 26813-14-9, being 1,3-Pentadiene, polymer with 2-methyl-2-butene, molecular formula: $(C_5H_{10}.C_5H_8)_x$) from Arizona Chemical Co., Nevtac from Neville Chemical, and Wingtack from Goodyear are terpene tackifiers. The terpene tackifier is preferably Sta-Tac, less preferably Wingtack or Nevtac or any tackifier which is based on a terpene or polyterpene resin, or mixtures of the foregoing. The stearifying agent is as described above.

Optionally, the formulations are at least 50, more preferably 60, more preferably 65, more preferably 70, 74, 75, 78, 80, 85, and 88 and not more than 90, 91, or 92, weight percent zinc oxide powder, at least 7, 8, 9, 10, 12, or 15, weight percent asphalt or terpene tackifier, and at least 1, 2, 2.5, 3 or 4, weight percent stearifying agent.

In each formulation the components other than the zinc oxide form a binder or homogenizing binder or homogenizing agent or homogenizing additive or carrier or carrier system.

To mix the invented dispersion, charge all the components into a heated mixer such as a Sigma Mixer at 250° F. and blend together until the mixture becomes a homogeneous paste. The hot paste is then put through a forming stage such as an extruder or other apparatus to form the compound into pellets, rods or sheets. The mixing and extruding can be done on a continuous system such as a mixing extruder or other continuous system known in the art. To enhance pelletizing or other shape forming, ethylene-vinylacetate (EVA) or similar thermoplastic having a melting point of about 350–400° F. can be added to the mix at the rate of 3–5 parts EVA per 100 parts asphalt, or 10–15 parts EVA per 75 parts terpene tackifier.

Formulation 1 (with EVA as noted) is a dark brown, hard rod, pellet, flake or sheet with a softening point of about 165–175° F. and a specific gravity of about 3. Formulation 2 (with EVA as noted) is a bright white, hard pellet, flake, bead or rod with a softening point of about 130–140° F. and a specific gravity of about 3.

The invented zinc oxide dispersion, which is a mixture or blend or predominantly a blend, is used by adding it in the way other known zinc oxide dispersions are added to natural rubbers, synthetic rubbers, and mixtures thereof, the synthetic rubbers being preferably polychloroprene, bromobutyl, halobutyl and chlorinated polyethylene, less preferably styrene-butadiene, isobutylene-based such as butyl and isobutylene-paramethylstyrene copolymer, polybutadiene, ethylene-propylene-diene rubber (EPDM), nitrile, acrylic, epichlorohydrin, ethylene/acrylic, ethylene-propylene rubber (EPM), isoprene-acrylonitrile, polyisoprene, polynorbornene, and styrene-isoprene. The invented zinc oxide dispersion is preferably an activator for natural and synthetic rubbers and a vulcanizer for polychloroprene and other halogenated elastomers. The rubber compounds made with the invented dispersion find particular utility for tires, tire treads, carcasses, sidewalls, coating stocks, hoses, belting, inner tubes, innerliners, general purpose rubbers, and other uses. The rubber compounds may include accelerators, retarders, other activators, other vulcanizers, antioxidants, antiozonants, protective materials, plasticizers, processing aids, stabilizers, tackifiers, extenders, fillers, reinforcing materials, blowing agents, lubricants, polymerization materials, and other rubber compounding materials known in the art.

The invented zinc oxide dispersion is added to the rubber compound at a rate of 1–10, more preferably 2–6, more preferably 3–5, more preferably about 4, phr (parts per hundred parts of rubber), by adding it right on top of the first charge of filler such as carbon black, less preferably directly with the polymer before the filler.

The following Examples further illustrate various aspects of the invention.

EXAMPLE 1

A zinc oxide dispersion was prepared by mixing 17 parts asphalt (57% monor asphalt, 40% blown asphalt and 3% EVA), 3 parts stearic acid and 80 parts zinc oxide powder (hereinafter the "80% ZnO dispersion"; this same dispersion was used in Examples 1–4). This was tested against 100% ZnO powder as follows. Note that 10 parts of 100% ZnO powder has 10 parts ZnO, while 10 parts of 80% ZnO dispersion has only 8 parts ZnO.

A radial auto tire sidewall composition was mixed in a laboratory Brabender at 90° C. with 55 rpm rotor speed (this mixer at these settings was used in Examples 1–4) using the following sequential procedure. An exaggerated level of both zinc oxides was used in this experiment. 50 parts SIR20 natural rubber, 50 parts BR1207 polybutadiene synthetic rubber, and 5 parts 100% ZnO powder ("Control") or 80% ZnO dispersion ("Dispersion") were mixed for 30 seconds. 37.5 parts N330 carbon black and 4 parts Protac NPT (a mixture of hydrocarbon resins and naturally-occurring polymers) tackifier were added and mixed for 2 minutes. 12.5 parts N330 carbon black, 8 parts Sundex 790 aromatic oil, 2 parts Sunolite 240 petroleum wax, 2 parts Flectol polymerized 1,2-dihydro-2,2,4-trimethylquinoline antioxidant, and 2 parts stearic acid were added and mixed 2 min., discharged and cooled. 1.25 parts soluble sulfur and 1.75 parts Santocure MOR 4-benzothiazole-2-sulfenyl morpholine accelerator were added on a laboratory mill. The 80% ZnO dispersion incorporated into the rubber batch at a significantly faster rate compared to the 100% ZnO powder.

Physical and state of cure properties were tested in accordance with ASTM methods, with the following results. Heat aged physicals are at 24 hours at 100° C.

|  | Original Cured Physicals | | Heat Aged Physicals | |
| --- | --- | --- | --- | --- |
|  | Control | Dispersion | Control | Dispersion |
| Shore A hardness | 60 | 60 | 64 | 64 |
| Tensile (lb/in$^2$) | 2465 | 2513 | 2328 | 2412 |
| 100% modulus (lb/in$^2$) | 224 | 234 | 320 | 327 |
| 300% modulus (lb/in$^2$) | 998 | 1042 | 1488 | 1445 |
| Elongation (%) | 529 | 538 | 417 | 450 |
| Die-C tear (lb/in) | 252 | 238 | 204 | 230 |
| Trouser tear (lb/in) | 82 | 81 | 95 | 97 |

The mixing energy (amps at discharge) was: Control—10.5; Dispersion—10.25. Rheometer data (30 min.; 160° C.; 3° arc; ODR; 100 inch-lb torque range) for max. torq., min. torq., TS(1), and TC(90), respectively, was: Control: 62.5, 5.3, 5.2, and 13.8, respectively; and Dispersion: 62.6, 5.6, 5.2, and 13.3, respectively. Surprisingly, the 80% ZnO dispersion was equal to or better than the control in most regards, despite having 20% less ZnO.

EXAMPLE 2

Polychloroprene Compound

This experiment uses a chlorinated elastomer which is very sensitive to ZnO levels. 60 parts Neoprene W, 40 parts Neoprene TM, and 4 parts Maglite D MgO were mixed 30 sec. 15 parts N990 carbon black, 2 parts Promix 130 zinc salt of higher molecular weight fatty acids processing aid, and 2 parts AgeRite Stalite S octylated diphenylamines antioxidant were added and mixed 60 seconds. 15 parts N990 carbon black, 1 part stearic acid, 30 parts Nucap 200 hard Kaolin clay and 25 parts Sundex 790 aromatic oil were added, mixed 3 min. and discharged. Batch was cross cut 5 times on a laboratory mill, removed and cooled. The batch was returned to the Brabender and there was added and mixed for 60 seconds, 0.25 parts ethylene thiourea (ETU) accelerator and varying amounts of 100% ZnO powder and 80% ZnO dispersion (0, 0.33, 0.75, 1.00, 1.50, 2.00, and 3.00 phr 100% ZnO powder being Samples O, A, B, C, D, E, and F, respectively, and 0, 0.33, 0.75, 1.00, 1.50, 2.00 and 3.00 phr 80% ZnO dispersion being Samples O, G, H, I, J, K, and L, respectively). The samples were then discharged, cooled and cross cut 5 times on a laboratory mill. The 80% ZnO dispersion incorporated into the rubber batch faster than the 100% ZnO powder and at the higher levels of the 80% dispersion compound nerve was reduced, resulting in improved processing properties.

Test data, in accordance with ASTM methods, is as follows. Viscosity is ML(1+4)@100° C.

| Sample | Duro-meter (Shore A) | 100% modulus (psi) | 300% modulus (psi) | 500% modulus (psi) | Percent Elongation | Tensile (psi) | Mooney Viscosity |
|---|---|---|---|---|---|---|---|
| 0 | 34 | 29 | 56 | 214 | 818 | 606 | 14.3 |
| A | 37 | 56 | 182 | 413 | 800 | 1070 | 16.9 |
| B | 39 | 43 | 177 | 529 | 770 | 1289 | 17.4 |
| C | 40 | 49 | 210 | 596 | 750 | 1410 | 16.5 |
| D | 42 | 63 | 230 | 664 | 806 | 1550 | 16.6 |
| E | 44 | 63 | 220 | 689 | 770 | 1500 | 16.8 |
| F | 45 | 69 | 228 | 620 | 781 | 1553 | 16.7 |
| G | 40 | 62 | 210 | 561 | 793 | 1330 | 16.0 |
| H | 42 | 63 | 190 | 536 | 790 | 1382 | 15.8 |
| I | 42 | 70 | 197 | 547 | 803 | 1417 | 16.2 |
| J | 44 | 76 | 220 | 607 | 806 | 1597 | 16.0 |
| K | 45 | 90 | 249 | 705 | 781 | 1605 | 16.6 |
| L | 46 | 84 | 205 | 661 | 826 | 1758 | 17.0 |

Rheometer data (30 min.; 350° F.; 3° arc; 100 inch-lb torque range) was as follows:

| Sample | Max. Torque | Min. Torque | TS(1) | TC(90) |
|---|---|---|---|---|
| O | 8.61 | 0.64 | 3.75 | 27.42 |
| A | 14.00 | 0.83 | 3.42 | 26.75 |
| B | 17.08 | 0.83 | 3.21 | 26.46 |
| C | 17.79 | 0.64 | 3.08 | 26.71 |
| D | 22.28 | 0.83 | 3.21 | 25.96 |
| E | 21.38 | 0.96 | 3.38 | 25.83 |
| F | 21.32 | 0.77 | 3.33 | 25.79 |
| O | 8.61 | 0.77 | 3.75 | 27.46 |
| G | 16.18 | 0.83 | 3.58 | 26.75 |
| H | 17.34 | 0.90 | 3.75 | 26.96 |
| I | 19.78 | 1.03 | 3.50 | 26.38 |
| J | 22.16 | 1.03 | 3.13 | 26.17 |
| K | 22.16 | 1.35 | 3.25 | 26.21 |
| L | 23.50 | 1.28 | 2.88 | 25.63 |

Surprisingly, the 80% ZnO dispersion samples had overall improved cure and physical properties compared to the control samples.

EXAMPLE 3

To evaluate the incorporation characteristics of ZnO, both the 80% ZnO dispersion and 100% ZnO powder were added very late into the mixing cycle and only allowed to mix for a short period of time. The radial sidewall formulation of Example 1 was tested using the 80% dispersion and the 100% powder at 5 phr. The mixing procedure was as follows. The polymers were mixed for 30 seconds. 75% of the N330, the Protac NPT and the Flectol were added and mixed 2 minutes. 25% of the N330, the oil, wax, and stearic acid were added and mixed 2 min. The 100% ZnO powder ("Control") or 80% ZnO dispersion ("Dispersion") were added and mixed for 30 seconds; batch discharged and cooled. The sulfur and MOR were added on a laboratory mill, cross cut 5 times, removed and cooled.

Test data, per ASTM methods, is as follows. Rheometer settings were the same as in Example 1.

| | Control | Dispersion |
|---|---|---|
| Shore A hardness | 60 | 60 |
| 100% modulus (lb/in$^2$) | 254 | 219 |
| 300% modulus (lb/in$^2$) | 1040 | 1021 |
| Elongation (%) | 560 | 630 |
| Tensile (psi) | 2480 | 2631 |
| Mooney Viscosity | 43 | 40 |
| Die-C tear (lb/in) | 267 | 276 |
| Max. torque | 62.5 | 62.6 |
| Min. torque | 5.3 | 5.6 |
| TS(1) | 5.2 | 5.2 |
| TC(90) | 13.8 | 13.3 |

Surprisingly, the 80% ZnO dispersion demonstrated equal or slightly better cure state and physical properties than the 100% ZnO powder, despite the fact 20% less actual ZnO powder was present. At normal rubber processing temperatures the 80% ZnO dispersion was transformed into a soft paste during mixing and incorporated into the rubber compound significantly faster than the ZnO powder. The invented dispersion improves processing properties, i.e., less nerviness and reduced viscosity of the rubber compound.

EXAMPLE 4

The rubber formulation of Example 3 was tested with 5 phr 100% ZnO powder ("Control"), 5 phr 80% ZnO dispersion from Example 1 ("Sample A"), 5 phr 85% ZnO dispersion (11.5 parts of the asphalt of Example 1, 3.5 parts stearic acid, and 85 parts zinc oxide powder) ("Sample B"), and 5 phr Elast-O-Zinc Curebeads from Elastochem Inc. (a commercially-available 88% ZnO powder dispersed in an organic based binder) ("Sample C"). The mixing procedure was the same as Example 3 except the ZnO was mixed for 45 seconds.

Physical properties test data is as follows. Compression set was 22 hours at 158° F.

| | Control | Sample A | Sample B | Sample C |
|---|---|---|---|---|
| Shore A hardness | 60 | 60 | 60 | 60 |
| 100% modulus | 254 | 219 | 220 | 165 |
| 300% modulus | 1040 | 921 | 910 | 890 |
| Elongation (%) | 560 | 631 | 575 | 548 |
| Tensile (psi) | 2480 | 2632 | 2511 | 2370 |
| Die-C tear (lb/in) | 262 | 276 | 269 | 241 |
| Mooney Viscosity | 43 | 42 | 44 | 46 |

-continued

|               | Control | Sample A | Sample B | Sample C |
|---------------|---------|----------|----------|----------|
| Rebound (%)   | 40.9    | 39.8     | 39.5     | 39.0     |
| Compression set | 20.0% | 20.0%    | 17.0%    | 17.9%    |

Surprisingly, the invented 80% and 85% dispersions demonstrated many superior physical properties over the Elast-O-Zinc commercial product.

Although the preferred embodiments have been described, it is understood that various modifications and replacements of the components and methods may be resorted to without departing from the scope of the invention as disclosed and claimed herein.

What is claimed is:

1. A rubber compound comprising a) rubber selected from the group consisting of natural rubbers, synthetic rubbers, and mixtures of any of the foregoing and b) a zinc oxide dispersion comprising at least 40 weight percent zinc oxide powder and at least 5 weight percent of a binder selected from the group consisting of asphalt and terpene tackifiers, said zinc oxide dispersion being present in said rubber compound at a rate of 1 to 10 parts zinc oxide dispersion per hundred parts rubber.

2. A rubber compound according to claim 1, wherein said binder is asphalt.

3. A rubber compound according to claim 2, said dispersion being at least 60 weight percent zinc oxide powder and at least 7 weight percent asphalt.

4. A rubber compound according to claim 3, said dispersion being at least 70 weight percent zinc oxide powder and at least 10 weight percent asphalt.

5. A rubber compound according to claim 2, said dispersion further comprising at least 0.5 weight percent stearifying agent.

6. A rubber compound according to claim 2, said dispersion further comprising at least 1.5 weight percent fatty acid.

7. A rubber compound according to claim 3, said dispersion further comprising at least 1.5 weight percent fatty acid.

8. A rubber compound according to claim 1, wherein said binder is selected from the group consisting of terpene tackifiers and mixtures thereof, said dispersion comprising at least 60 weight percent zinc oxide powder and at least 7 weight percent terpene tackifier.

9. A rubber compound according to claim 8, said dispersion further comprising at least 0.5 weight percent stearifying agent.

10. A rubber compound according to claim 9, said dispersion further comprising petrolatum.

11. A rubber compound according to claim 8, said dispersion further comprising at least 1.5 weight percent fatty acid.

12. A method of making a vulcanized rubber product comprising the steps of:

a) incorporating a zinc oxide dispersion into a rubber compound, optionally incorporating an accelerator into said rubber compound, optionally incorporating a vulcanizer other than zinc oxide into said rubber compound, said zinc oxide dispersion comprising at least 40 weight percent zinc oxide powder and at least 5 weight percent of a binder selected from the group consisting of asphalt and terpene tackifiers, said rubber compound comprising rubber selected from the group consisting of natural rubbers, synthetic rubbers, and mixtures thereof, said zinc oxide dispersion being incorporated into said rubber compound at a rate of 1 to 10 parts zinc oxide dispersion per hundred parts rubber; and b) vulcanizing said rubber compound to yield said vulcanized rubber product.

13. A method according to claim 12, wherein said binder is asphalt.

14. A method according to claim 13, said dispersion being at least 60 weight percent zinc oxide powder and at least 7 weight percent asphalt.

15. A method according to claim 14, said dispersion being at least 70 weight percent zinc oxide powder and at least 10 weight percent asphalt.

16. A method according to claim 13, said dispersion further comprising at least 0.5 weight percent stearifying agent.

17. A method according to claim 13, said dispersion further comprising at least 1.5 weight percent fatty acid.

18. A method according to claim 14, said dispersion further comprising at least 1.5 weight percent fatty acid.

19. A method according to claim 12, wherein said binder is selected from the group consisting of terpene tackifiers and mixtures thereof, said dispersion comprising at least 60 weight percent zinc oxide powder and at least 7 weight percent terpene tackifier.

20. A method according to claim 19, said dispersion further comprising at least 0.5 weight percent stearifying agent.

21. A method according to claim 20, said dispersion further comprising petrolatum.

22. A method according to claim 19, said dispersion further comprising at least 1.5 weight percent fatty acid.

23. A zinc oxide dispersion consisting of at least 40 weight percent zinc oxide powder, at least 5 weight percent of a binder selected from the group consisting of asphalt and terpene tackifiers, and at least 0.5 weight percent stearifying agent.

24. A zinc oxide dispersion comprising at least 40 weight percent zinc oxide powder, at least 5 weight percent asphalt and at least 0.5 weight percent fatty acid.

25. A zinc oxide dispersion according to claim 24, wherein said dispersion comprises at least 60 weight percent zinc oxide powder and at least 7 weight percent asphalt.

26. A zinc oxide dispersion according to claim 24, wherein said dispersion comprises at least 70 weight percent zinc oxide powder and at least 10 weight percent asphalt.

27. A zinc oxide dispersion according to claim 24, wherein said dispersion comprises at least 1.5 weight percent fatty acid and not more than 10 weight percent fatty acid.

28. A zinc oxide dispersion according to claim 24, wherein said dispersion consists essentially of 60–92 weight percent zinc oxide powder, 7–30 weight percent asphalt and 0.5–10 weight percent fatty acid.

29. A zinc oxide dispersion comprising at least 50 weight percent zinc oxide powder, at least 5 weight percent terpene tackifier and 0.5–10 weight percent stearifying agent.

30. A zinc oxide dispersion according to claim 29, wherein said dispersion comprises at least 60 weight percent zinc oxide powder and at least 7 weight percent terpene tackifier.

31. A zinc oxide dispersion according to claim 29, wherein said dispersion comprises at least 70 weight percent zinc oxide powder and at least 10 weight percent terpene tackifier.

32. A zinc oxide dispersion according to claim 29, said dispersion being 1.5–10 weight percent stearifying agent, said stearifying agent being fatty acid.

33. A zinc oxide dispersion according to claim 29, said dispersion further comprising petrolatum.

34. A rubber compound according to claim 1, said zinc oxide dispersion being present in said rubber compound at a rate of 2 to 6 parts zinc oxide dispersion per hundred parts rubber.

35. A method according to claim 12, wherein said zinc oxide dispersion is incorporated into said rubber compound at a rate of 2 to 6 parts zinc oxide dispersion per hundred parts rubber.

* * * * *